United States Patent
Denning et al.

(10) Patent No.: US 11,431,719 B2
(45) Date of Patent: Aug. 30, 2022

(54) DYNAMIC ACCESS EVALUATION AND CONTROL SYSTEM

(71) Applicant: Bank of America Corporation, Charlotte, NC (US)

(72) Inventors: John H. Denning, Charlotte, NC (US); Ruchira Ghosh, Southlake, TX (US); W. Scott Hammet, Charlotte, NC (US); Levi Weldon Mcvay, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 205 days.

(21) Appl. No.: 16/908,907

(22) Filed: Jun. 23, 2020

(65) Prior Publication Data

US 2021/0400049 A1 Dec. 23, 2021

(51) Int. Cl.
*H04L 29/00* (2006.01)
*H04L 9/40* (2022.01)

(52) U.S. Cl.
CPC ........ *H04L 63/102* (2013.01); *H04L 63/0838* (2013.01); *H04L 63/105* (2013.01); *H04L 63/108* (2013.01); *H04L 63/1433* (2013.01); *H04L 63/20* (2013.01)

(58) Field of Classification Search
CPC . H04L 63/102; H04L 63/0838; H04L 63/105; H04L 63/108; H04L 63/1433; H04L 63/20; H04L 2463/082
See application file for complete search history.

(56) References Cited

U.S. PATENT DOCUMENTS

| | | | |
|---|---|---|---|
| 8,132,230 B2 | 3/2012 | Akita | |
| 8,146,160 B2* | 3/2012 | Orr | H04L 63/08 713/168 |
| 8,225,416 B2* | 7/2012 | Richards | G06Q 10/10 726/27 |
| 8,490,152 B2 | 7/2013 | Staiman et al. | |
| 8,683,568 B1* | 3/2014 | Khitrenovich | H04L 63/08 726/28 |
| 8,763,069 B2 | 6/2014 | Renfro et al. | |
| 8,990,906 B2* | 3/2015 | Holland | G06F 21/88 726/6 |
| 9,189,644 B2 | 11/2015 | Kling et al. | |
| 9,202,173 B1* | 12/2015 | Dotan | G06N 5/04 |
| 9,356,968 B1* | 5/2016 | Dotan | H04L 63/20 |
| 9,483,488 B2 | 11/2016 | Kling et al. | |

(Continued)

FOREIGN PATENT DOCUMENTS

CN 109428878 B * 11/2021 ......... H04L 63/1416

*Primary Examiner* — Don G Zhao
(74) *Attorney, Agent, or Firm* — Banner & Witcoff, Ltd.

(57) ABSTRACT

Systems for dynamically evaluating and controlling access to applications and systems are presented. In some examples, registration data may be received. In some examples, unauthorized activity data may be received. The unauthorized activity data may be analyzed to identify one or more vulnerable applications. Users of the one or more vulnerable applications may then be identified. Entitlements for the one or more vulnerable applications may be identified and, in particular, entitlements having privileged access may be identified. Users having entitlements with privileged access may be identified and one or more modified authentication requirements may be implemented.

21 Claims, 12 Drawing Sheets

(56) References Cited

U.S. PATENT DOCUMENTS

| | | |
|---|---|---|
| 9,495,380 B2 | 11/2016 | Kling et al. |
| 9,558,334 B2 | 1/2017 | Kling et al. |
| 9,584,525 B2 | 2/2017 | Baikalov et al. |
| 9,727,729 B2 | 8/2017 | Gupta |
| 10,043,026 B1* | 8/2018 | Salour ................. G06F 16/2365 |
| 10,248,915 B2* | 4/2019 | Foley ................. G06Q 10/0635 |
| 10,469,251 B2* | 11/2019 | Wu ....................... H04L 9/0894 |
| 10,509,906 B2 | 12/2019 | Gupta |
| 10,567,375 B1* | 2/2020 | Mossier ................ H04L 63/101 |
| 10,909,539 B2* | 2/2021 | Fisher ................ G06Q 20/40145 |
| 10,979,430 B1* | 4/2021 | Hitchcock ............ H04L 63/102 |
| 2007/0136573 A1* | 6/2007 | Steinberg ............ H04L 63/0853 713/155 |
| 2008/0276098 A1* | 11/2008 | Florencio ................ G06F 21/46 713/183 |
| 2009/0106556 A1* | 4/2009 | Hamid .................... H04L 63/18 713/176 |
| 2010/0071024 A1* | 3/2010 | Eyada ................ H04L 63/0263 726/1 |
| 2013/0167211 A1* | 6/2013 | Kamat .................... H04L 63/08 726/7 |
| 2014/0053238 A1* | 2/2014 | Brannon ................. G06F 21/45 726/4 |
| 2017/0339176 A1* | 11/2017 | Backer .................. H04L 63/108 |
| 2017/0346837 A1* | 11/2017 | Vaswani ............... H04L 63/102 |
| 2018/0077188 A1* | 3/2018 | Mandyam ............... G06F 21/56 |
| 2018/0077195 A1* | 3/2018 | Gathala ............... H04L 63/1433 |
| 2018/0124033 A1* | 5/2018 | Greenspan ............. G06F 21/31 |
| 2018/0288060 A1* | 10/2018 | Jackson ............... H04L 63/102 |
| 2019/0052661 A1* | 2/2019 | Anand .................... H04L 63/06 |
| 2019/0253427 A1 | 8/2019 | Kling et al. |
| 2019/0347666 A1* | 11/2019 | Bermudez-Cisneros .................... G06Q 20/40145 |
| 2020/0053111 A1* | 2/2020 | Jakobsson ............... H04L 51/12 |
| 2020/0099682 A1* | 3/2020 | Alexander ............. H04L 67/18 |
| 2020/0252422 A1* | 8/2020 | Davis .................... H04L 63/102 |
| 2020/0311250 A1* | 10/2020 | Sandstrom ............. G06F 21/36 |
| 2020/0387594 A1* | 12/2020 | Sandstrom ............ H04L 9/3226 |
| 2021/0044976 A1* | 2/2021 | Avetisov ............ H04W 12/069 |
| 2021/0058395 A1* | 2/2021 | Jakobsson ............... H04L 63/08 |
| 2021/0367966 A1* | 11/2021 | Yanay .................. H04L 63/102 |
| 2021/0392142 A1* | 12/2021 | Stephens ............... H04L 63/105 |
| 2021/0400049 A1* | 12/2021 | Denning ............... H04L 63/102 |

* cited by examiner

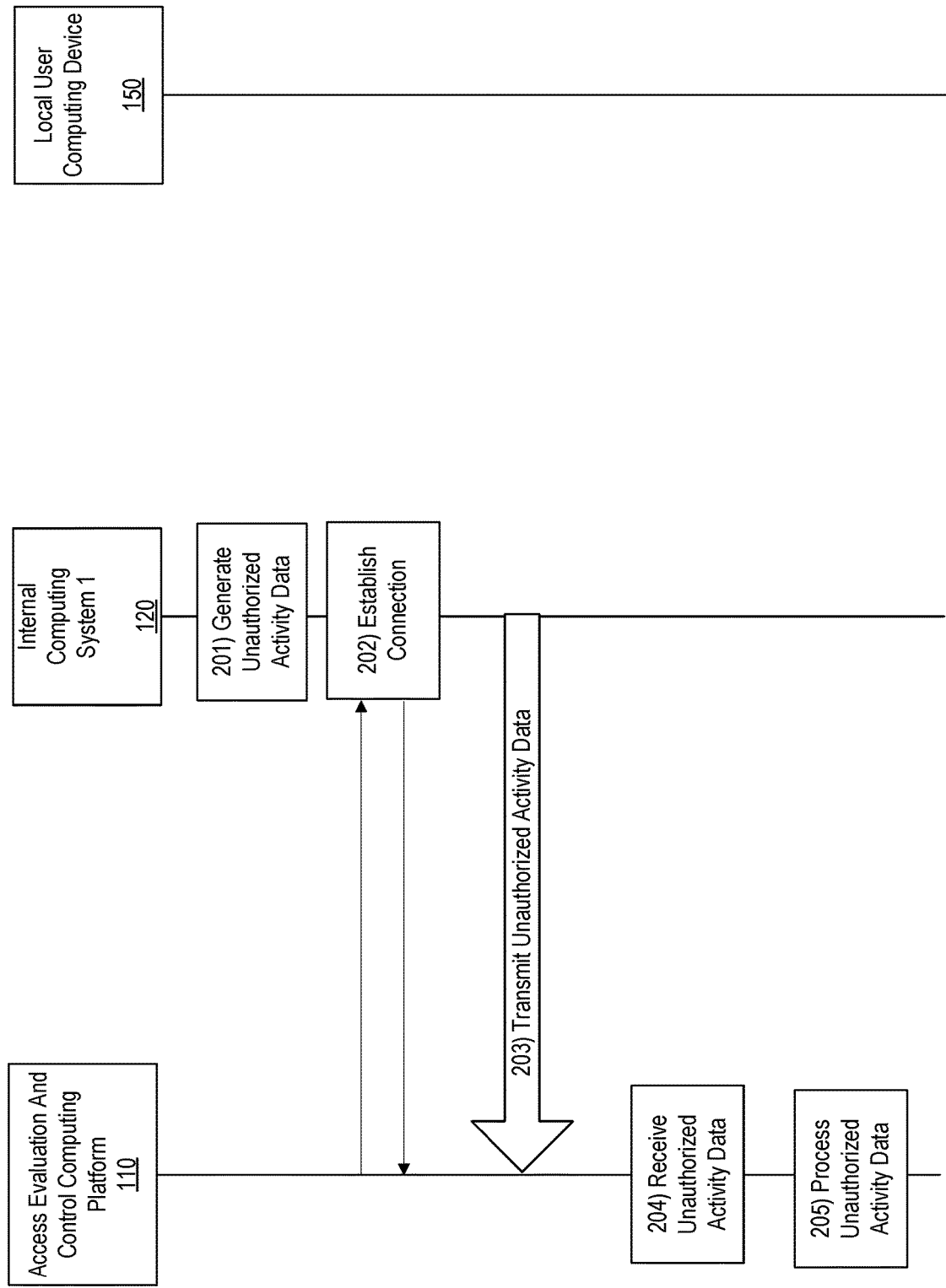

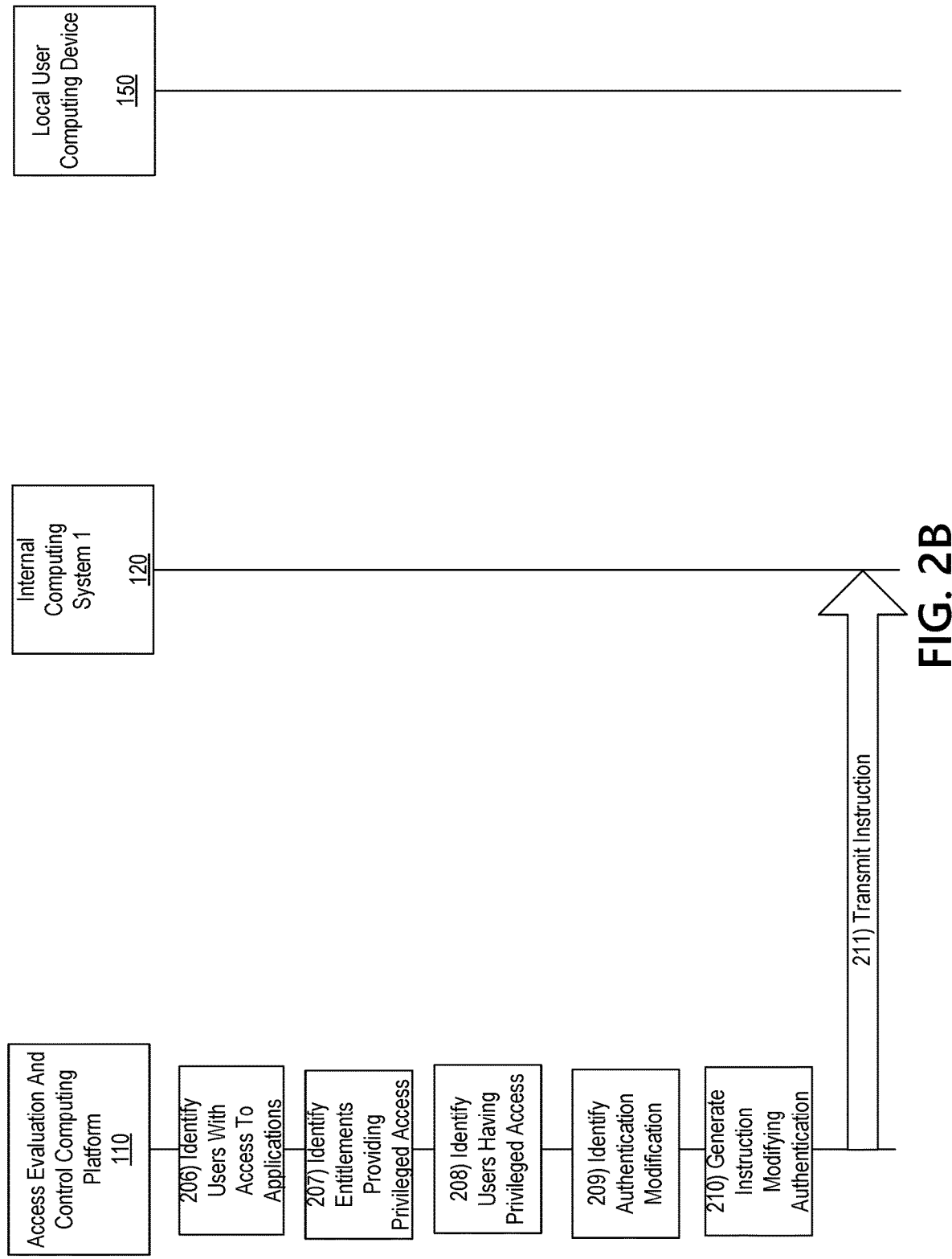

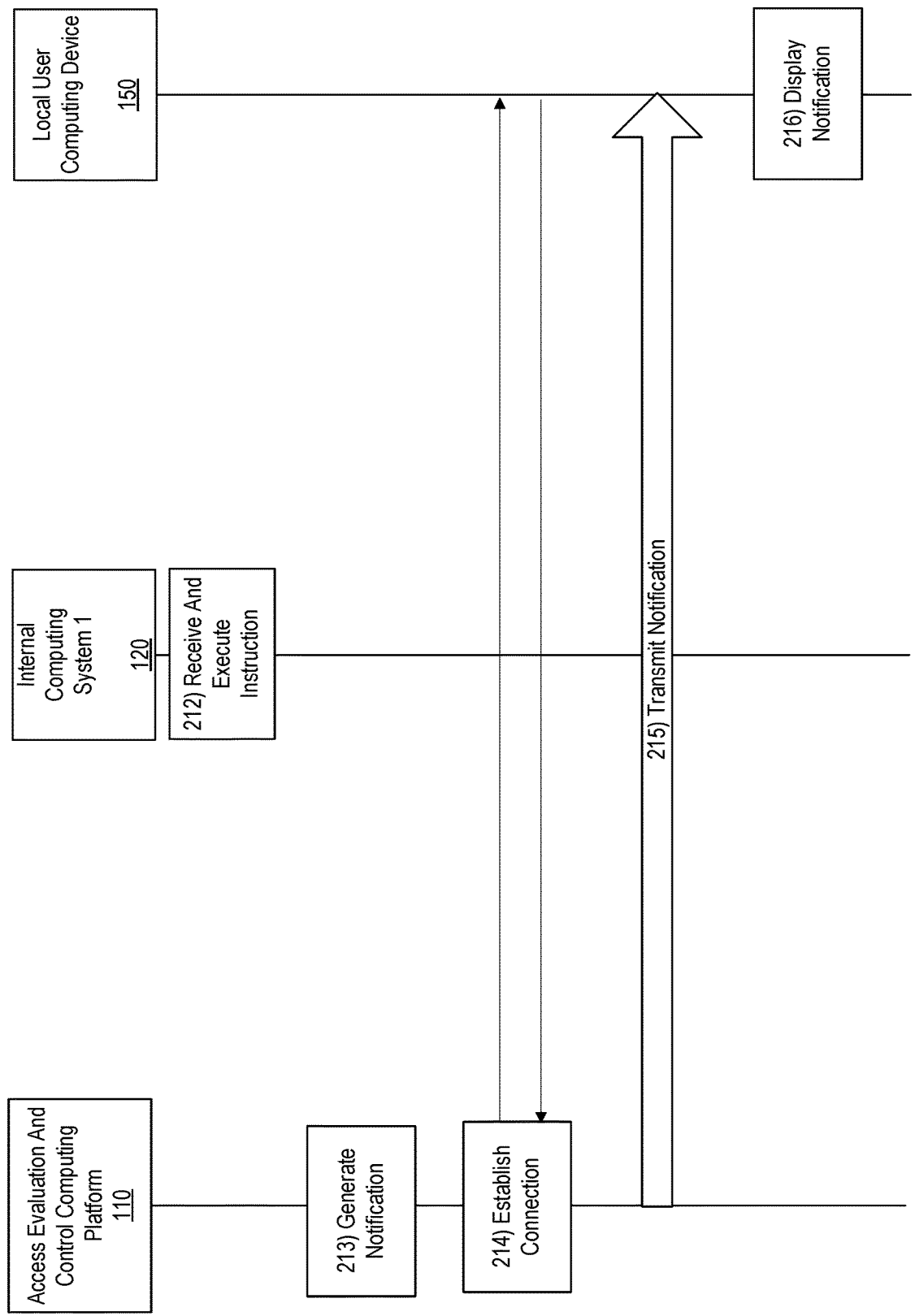

DYNAMIC ACCESS EVALUATION AND CONTROL SYSTEM

BACKGROUND

Aspects of the disclosure relate to electrical computers, systems, and devices for providing and performing dynamic access evaluation and control functions.

Large scale enterprises often host various customer facing systems and applications. Unauthorized users often use credential harvesting to gain access to systems, applications, data, and the like. Credential harvesting may include using compromised credentials, such as those obtained from unauthorized sources, to attempt unauthorized access to systems, applications and/or data. In many examples, unauthorized users may attempt an initial login to determine whether credentials are valid. If so, the credentials may be used to access systems, accounts, data, and the like, without user authorization, may be sold to other unauthorized actors, or the like.

In order to combat this unauthorized activity, systems may monitor authentication portals to detect attempts to takeover an account or otherwise access data without authorization. This data may then be used to identify potential unauthorized activity and/or execute one or more mitigating actions.

Account takeovers can be damaging to individual users. For instance, users may suffer financial damages as well as other types of damages. However, if an account takeover is executed on an employee account (e.g., an employee of the entity who may also have an account for the external-facing system) the damage may be even greater. For instance, if that employee has privileged access (e.g., the ability to bypass controls), the damage any impact of the account takeover may impact both the user individually and the entity of which he is an employee. Accordingly, it may be advantageous to identify vulnerable accounts and employees having privileged access to those accounts and execute additional authentication requirements in order to mitigate impact of the unauthorized activity.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with dynamically evaluating and controlling access to one or more systems, applications, or the like.

In some examples, unauthorized activity data may be received. The unauthorized activity data may be analyzed to identify one or more vulnerable applications. Users of the one or more vulnerable applications may then be identified. Entitlements for the one or more vulnerable applications may be identified and, in particular, entitlements having privileged access may be identified. Users having entitlements with privileged access may be identified and one or more modified authentication requirements may be implemented.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing dynamic access evaluation and control functions in accordance with one or more aspects described herein;

DETAILED DESCRIPTION

Figure 1A:
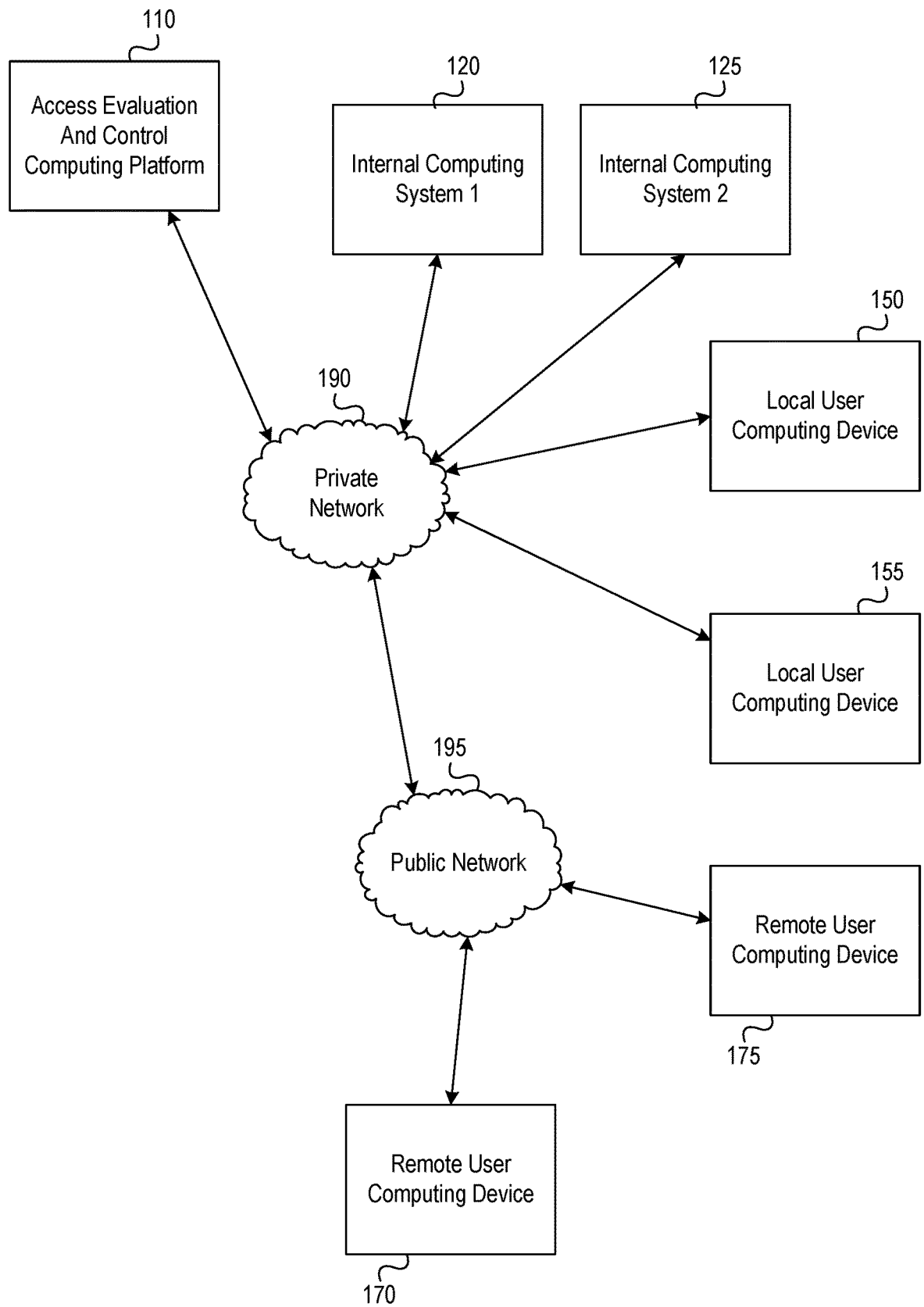
FIGS. 1A and 1B depict an illustrative computing environment for implementing dynamic access evaluation and control functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, unauthorized activity can greatly impact customers of an entity. For instance, account takeovers, such as when an unauthorized actor attempts to take over or does take over a legitimate user account, can be damaging to the user. When the user is an employee of the entity in addition to being a customer, the risk is even greater. For instance, if an employee has privileged access to an application (e.g., is able to bypass controls) the damage done by the unauthorized actors can impact both the user/employee and the entity. For instance, by taking over an account of an employee, the unauthorized actor may access additional information, modify controls in the systems, and the like, in addition to causing harm to the employee as a customer.

Accordingly, arrangements described herein provide for evaluation of user access at an entitlement level and enable control of authentication requirements for different users in order to mitigate any impact of unauthorized activity. As will be discussed more fully herein, unauthorized activity data may be received and analyzed to identify one or more vulnerable or potentially vulnerable applications. The vulnerable or potentially vulnerable applications may be determined based on number of account takeover attempts, actual account takeovers, or the like.

In some examples, users associated with the vulnerable or potentially vulnerable applications may be identified. Entitlements, such as entitlements having privileged access (e.g., ability to bypass controls) may be identified for the vulnerable or potentially vulnerable applications.

In some arrangements, the users having privileged access may be identified. In some examples, the users having privileged access may be a subset of the users identified as associated with the vulnerable or potentially vulnerable applications.

In some examples, one or more modified authentication requirements may then be identified for the users having privileged access. For instance, multi-factor authentication may be required, use of a particular or alternate username or user identifier may be required, or the like. The modified authentication requirements may then be implemented or executed to mitigate any impact of unauthorized activity.

These and various other arrangements will be discussed more fully below.

Figure 1B:
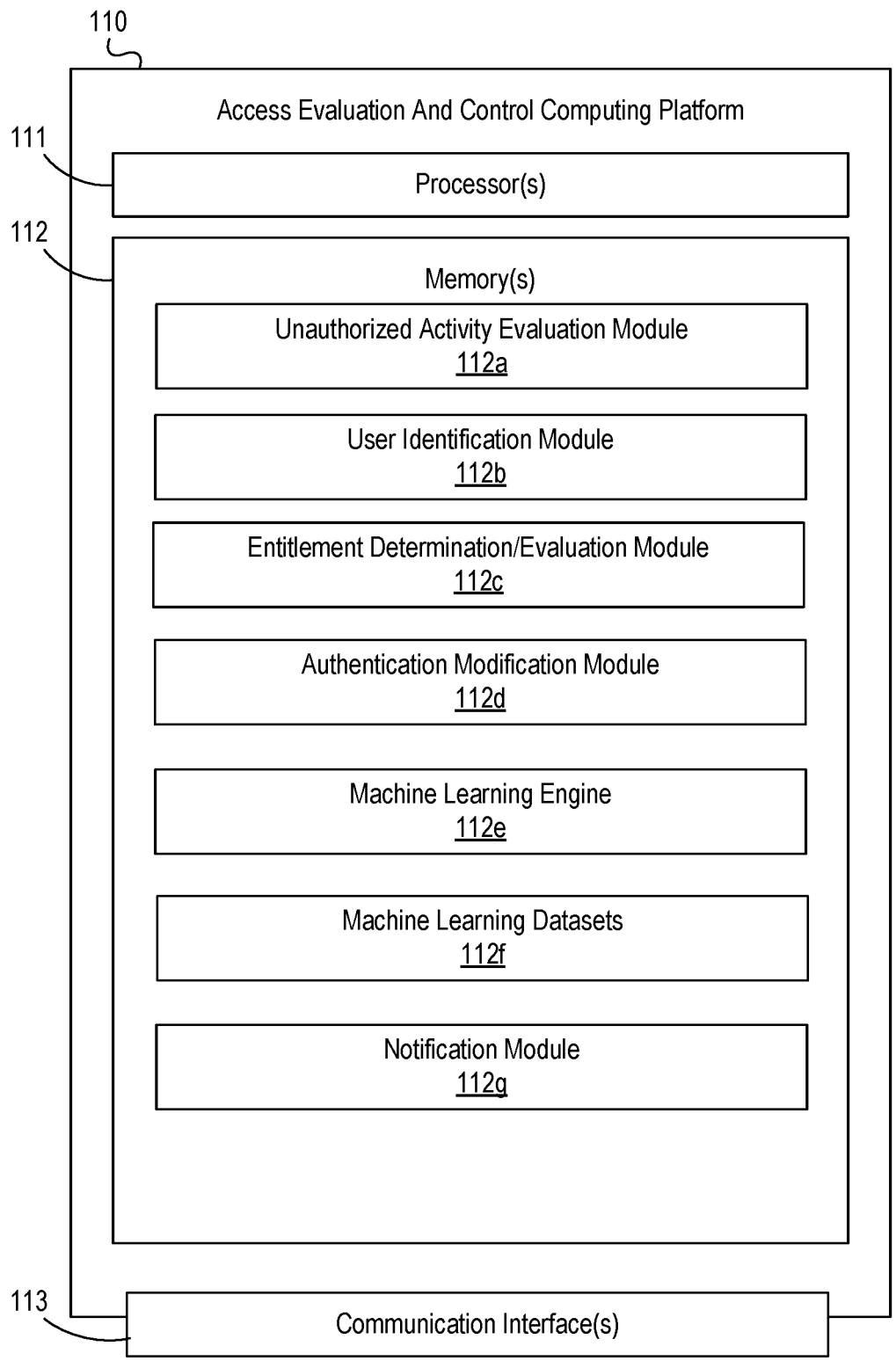

FIGS. 1A-1B depict an illustrative computing environment for implementing dynamic access evaluation and control functions in accordance with one or more aspects described herein. Referring to FIG. 1A, computing environment 100 may include one or more computing devices and/or other computing systems. For example, computing environment 100 may include access evaluation and control computing platform 110, internal computing system 1 120, internal computing system 2 125, a first local user computing device 150, a second local user computing device 155, a first remote user computing device 170, and a second remote user computing device 175. Although two internal computing systems 120, 125, two local user computing device 150, 155 and two remote user computing device 170, 175 are shown, more or fewer devices may be used without departing from the invention.

Access evaluation and control computing platform 110 may be configured to provide intelligent, dynamic, access evaluation and control functions. Access evaluation and control computing platform 110 may be a computer system that includes one or more computing devices (e.g., servers, server blades, or the like) and/or other computer components (e.g., processors, memories, communication interfaces) that may be used to implement machine learning algorithms, or the like to recognize patterns and identify users having entitlements including privileged access in one or more client-facing applications, modify one or more authentication requirements associated with the user and execute the modified authentication requirements.

In some examples, unauthorized activity data, such as account takeover data, may be received by access evaluation and control computing platform 110. Account takeover data may include data indicating that an unauthorized actor has taken over or attempted to take over a legitimate user account (e.g., an account of a customer of the entity). The unauthorized activity data may be analyzed to identify one or more applications that may be considered vulnerable or potentially vulnerable. Based on the identified applications, users, such as employees of the entity or enterprise organization implementing the access evaluation and control computing platform, having access to the identified vulnerable or potentially vulnerable applications may be identified. In at least some examples, the users may be employees of the entity but may also be a customer-user of the application identified as vulnerable or potentially vulnerable, thereby increasing the potential impact of unauthorized activity.

In some arrangements, entitlements, such as rules governing user access to an application, for each vulnerable or potentially vulnerable application may be identified. Further, entitlements having privileged access may be determined.

Based on the entitlements having privileged access and the users having access to each application, a subset of users may be determined. The subset may include users having access to the application and are privileged entitlement holders. One or more authentication modifications may then be identified and executed for each user of the subset of users. For instance, users having a primary identifier and a secondary identifier may be required to use the secondary identifier to access the application. In another example, multi-factor authentication may be required to access the application. In some examples, one factor of the multi-factor authentication may include a single user passcode that may be available for a predetermined period of time before expiring or being deleted (e.g., 8 hours, 12 hours, or the like). In some examples, the predetermined period of time may correspond to a user's shift being worked. Accordingly, the user may access applications with the privileged entitlements during the shift but outside of the shift may access with standard entitlements.

These arrangements enable the systems described herein to control access to applications based on user entitlements, rather than based on a user role or other criteria. Accordingly, more granular control of access may be provided.

Internal computing system 1 120 and/or internal computing system 2 125 may be various systems internal to the enterprise that may host or execute systems to which a user may attempt to login (e.g., an online banking application, a mobile banking application, or the like). In some examples, internal computing system 1 120 and/or internal computing system 2 125 may include systems, applications, and the like, to evaluate login attempts to detect potential account takeovers. For instance, internal computing system 1 120 and/or internal computing system 2 125 may evaluate login attempts to detect an increase in invalid usernames being used. In another example, internal computing system 1 120 and/or internal computing system 2 125 may evaluate login attempts compared to known habits of a user (e.g., compare device from which the login attempt is received to known devices associated with the user, compare login times and locations to current login data, and the like) to detect an attempted account takeover. In some examples, logs associated with attempted logins may be continuously received, e.g., in real-time or near real-time, to detect potential account takeover attempts and execute mitigating actions. Additionally or alternatively, logs may be analyzed at predetermined time intervals (e.g., every 5 minutes, every 10 minutes, or the like) to identify any occurrences of potential unauthorized activity.

Additionally or alternatively, local user computing device 150 and/or local user computing device 155 may be configured to view and/or further analyze data logs, account takeover data, and the like, and/or control parameters associated with access evaluation and control computing platform 110. In some examples, processed data identifying account takeovers and/or other unauthorized or potentially unauthorized activity may be transmitted from the internal computing system 1 120 and/or internal computing system 2 125, after processing and for further evaluation by access evaluation and control computing platform 110.

Internal computing system 1 120 and/or internal computing system 2 125 may further include data associated with users, such as employees of the enterprise or entity implementing the access evaluation and control computing platform 110, and/or authentication data associated with the one or more users (e.g., user identifiers, passwords, biometric data, and the like). In some examples, internal computing system 1 120 and/or internal computing system 2 125 may control authentication requirements and/or execute one or more authentication processes to provide or deny access to a user to one or more applications executing on internal computing system 1 120, internal computing system 2 125, or other internal computing system.

Local user computing device 150 and local user computing device 155 may be enterprise computing devices in communication with one or more other computing devices or systems. For instance, local user computing device 150 and/or local user computing device 155 may be computing devices configured to communicate with access evaluation and control computing platform 110 to receive and display one or more identified vulnerabilities, display identified users, display identified and/or executed authentication modifications and the like. In some examples, local user computing device 150 and/or local user computing device 155 may receive and display one or more notifications, reports, or the like, generated by access evaluation and control computing platform 110.

In some examples, local user computing device 150 and/or local user computing device 155 may be used by an employee of the entity to access one or more applications, modify one or more applications, and the like. For instance, if a user has privileged access entitlements to the application, the user may access the application, in some examples, via local user computing device 150 and/or local user computing device 155.

Remote user computing device 170 and remote user computing device 175 may be computing devices associated with a user outside of the enterprise and may, in some examples, be user computing devices (e.g., desktop computers, laptop computers, tablet computers, smartphones, and the like) that may be used to request access to an application or system, receive user login credentials, and the like. Remote user computing device 170 and/or remote user computing device 175 may be associated with authorized users of an account (e.g., legitimate login attempts) and/or unauthorized users (e.g., account takeover attempts).

Computing environment 100 also may include one or more computing platforms. For example, and as noted above, computing environment 100 may include access evaluation and control computing platform 110. As illustrated in greater detail below, access evaluation and control computing platform 110 may include one or more computing devices configured to perform one or more of the functions described herein. For example, access evaluation and control computing platform 110 may include one or more computers (e.g., laptop computers, desktop computers, servers, server blades, or the like).

As mentioned above, computing environment 100 also may include one or more networks, which may interconnect one or more of access evaluation and control computing platform 110, internal computing system 1 120, internal computing system 2 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization or enterprise (e.g., a corporation, financial institution, educational institution, governmental institution, or the like) and may interconnect one or more computing devices associated with the organization. For example, access evaluation and control computing platform 110, internal computing system 1 120, internal computing system 2 125, local user computing device 150, and local user computing device 155, may be associated with an organization or enterprise (e.g., a financial institution), and private network 190 may be associated with and/or operated by the organization, and may include one or more networks (e.g., LANs, WANs, virtual private networks (VPNs), or the like) that interconnect access evaluation and control computing platform 110, internal computing system 1 120, internal computing system 2 125, local user computing device 150, local user computing device 155, and one or more other computing devices and/or computer systems that are used by, operated by, and/or otherwise associated with the organization or enterprise. Public network 195 may connect private network 190 and/or one or more computing devices connected thereto (e.g., access evaluation and control computing platform 110, internal computing system 1 120, internal computing system 2 125, local user computing device 150, local user computing device 155) with one or more networks and/or computing devices that are not associated with the organization. For example, remote user computing device 170, remote user computing device 175, might not be associated with an organization or enterprise that operates private network 190 (e.g., because remote user computing device 170, and/or remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, and/or remote user computing device 175, to private network 190 and/or one or more computing devices connected thereto (e.g., access evaluation and control computing platform 110, internal computing system 1 120, internal computing system 2 125, local user computing device 150, local user computing device 155).

Referring to FIG. 1B, access evaluation and control computing platform 110 may include one or more processors 111, memory 112, and communication interface 113. A data bus may interconnect processor(s) 111, memory 112, and communication interface 113.

Communication interface 113 may be a network interface configured to support communication between dynamic access evaluation and control computing platform 110 and one or more networks (e.g., private network 190, public network 195, or the like). Memory 112 may include one or more program modules having instructions that when executed by processor(s) 111 cause access evaluation and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of access evaluation and control computing platform 110 and/or by different computing devices that may form and/or otherwise make up access evaluation and control computing platform 110.

For example, memory 112 may have, store and/or include unauthorized activity evaluation module 112a. Unauthorized activity evaluation module 112a may store instructions and/or data that may cause or enable the access evaluation and control computing platform 110 to receive unauthorized activity data and process it or receive processed unauthorized activity data and identify applications having a vulnerability or a potential vulnerability. For instance, in some examples, activity data such as login attempts, and the like, may be transmitted to access evaluation and control computing platform 110 for evaluation to identify account takeover attempts and/or other unauthorized activity. Additionally or alternatively, this analysis may be performed at, for instance, internal computing system 1 120 and/or internal computing system 2 125, and processed data may be transmitted and received by access evaluation and control computing platform 110.

For instance, data associated with one or more account takeover attempts or other unauthorized activity events may be received and processed (e.g., by internal computing system 1 120, internal computing system 2 125, unauthorized activity evaluation module 112a, or the like). In some examples, account takeover attempts may include an unauthorized user attempting to login to an account by inputting one or more usernames, username and password combinations, and the like, to attempt to identify valid login credentials. In another example, an account takeover attempt may include an unauthorized user logging in to an account using an authentic username and/or password combination that was obtained without the authorized user's authorization (e.g., via data breach, purchase from an unauthorized user, or the like). In some examples, access evaluation and control computing platform 110 and/or other devices or systems associated therewith (e.g., internal computing system 1 120, internal computing system 2 125, and the like) may evaluate and analyze the login and/or other data to identify potential account takeover occurrences and/or attempts. Identified account takeovers and/or account takeover attempts may be further analyzed to identify and/or execute one or more mitigating actions (e.g., lock an account, deny a requested service, or the like) in order to protect the user associated with the account.

Unauthorized activity evaluation module 112a may generate or receive processed unauthorized activity data and may evaluate the data to identify one or more applications with a vulnerability or a potential vulnerability. In some examples, machine learning may be used to identify applications having a vulnerability. For instance, data may be compared to one or more machine learning datasets 112f to identify patterns or sequences in data corresponding to a vulnerability or potential vulnerability. In some examples, unauthorized activity evaluation module 112a may generate a listing of applications identified as vulnerable or potentially vulnerable. In some examples, the applications identified as vulnerable or potentially vulnerable, and/or applications evaluated for potential vulnerabilities, may be externally-facing applications (e.g., client-facing applications).

Access evaluation and control computing platform 110 may further have, store and/or include user identification module 112b. User identification module 112b may store instruction and/or data that may cause or enable access evaluation and control computing platform 110 to identify one or more users having access to (e.g., valid login credentials, privileged entitlements, or the like) applications identified as vulnerable or potentially vulnerable. In some arrangements, users associated with each application identified as vulnerable or potentially vulnerable may be identified. In some examples, the user may be employees of the entity or enterprise implementing the access evaluation and control computing platform 110.

Access evaluation and control computing platform 110 may further have, store and/or include entitlement evaluation/determination module 112c. Entitlement evaluation/determination module 112c may store instructions and/or data that may cause or enable the access evaluation and control computing platform 110 to evaluate entitlements associated with identified applications. For instance, metadata from various sources may be received and analyzed to identify entitlements for an application, entitlements having privileged access, or the like. In some examples, the entitlement evaluation/determination module 112c may identify entitlements for each identified application. The entitlement evaluation/determination module 112c may evaluate the identified entitlements to identify which entitlements include privileged access (e.g., administrative access, access greater than a typical user, or the like) and may then identify users associated with the entitlements having privileged access. In some examples, the users identified may be a subset (e.g., fewer than all) users identified as having access to the applications (e.g., identified by the user identification module 112b).

Access evaluation and control computing platform 110 may further have, store and/or include authentication modification module 112d. Authentication modification module 112d may receive the users identified as having entitlements with privileged access and may further evaluate each user to determine whether an authentication modification should be generated and executed. For instance, in some examples, machine learning may be used to evaluate the users to determine whether one or more authentication modifications will be identified and executed. In some examples, identification of a user or user account having privileged access entitlements may cause or force the segregation of the privileged access to other accounts having additional limitations. For instance, one example authentication modification may include forcing segregation of the privileged access for a particular user and/or particular application to an alternate or secondary user identifier or login. The secondary or alternate user identifier may have additional limitations, such as being prevented from accessing the internet. This may prevent the credentials from being fished or otherwise harvested via malware and exported.

Additionally or alternatively, multi-factor authentication may be required. In some examples, one factor of the multi-factor authentication may include a single use or rotating passcode that may expire after a pre-determined time, such as an end of a work shift for the user.

In some examples, the identified users may be forced to a secondary user identifier (e.g., a secondary account) and additional modifications, such as multi-factor authentication may be required. For instance, the secondary identifiers may be vaulted which may include requiring further authentication requirements, such as multi-factor authentication, or other stepped-up authentication.

Accordingly, in order to access the account via unauthorized activity, typical login credentials would not be sufficient. Rather, the modified authentication requirements may also be required.

In some examples, a single-use passcode, one-time code, or the like may be used to retrieve credentials, access an account, or the like. The single-use passcode may expire after a predetermine time period. In some examples, input of the single-use passcode to authenticate a user may enable access for a predetermined period, such as every 8 hours, 12 hours, or the like. In some example arrangements, use of the single-use passcode may enable access to an account, application, system, or the like, for a predetermined time period that may and, at expiration of the single use passcode-enabled session (e.g., after 8 hours, 12 hours, or the like), the user account may be locked and the user may be required to request and input another (e.g., different) single-use passcode, or other modified authentication requirement, to re-access the system, account, application, or the like. In some examples, the system may permit access for a time period corresponding to a user work shift. The time period may be modified or customized as needed. For instance, if there is a heighted threat, the arrangements may cause the account, system, application to lockout a user after other periods (e.g., one hour, two hours, or the like).

While many aspects described herein discuss use of a one-time code or single-use passcode for modified authentication, other authentication factors may be used without departing from the invention. For instance, biometric data such as fingerprint, iris scan, facial recognition, voice print recognition, key sequences, input patterns, detection of a signal from a pre-registered mobile device (e.g., smart phone, wearable device, or the like) and the like, may be used for modified authentication requirements without departing from the invention.

As discussed herein, machine learning may be used to analyze data, such as unauthorized activity data, entitlement data, user data, or the like, to identify application vulnerabilities, users having privileged entitlements, or the like. Accordingly, access evaluation and control computing platform 110 may have, store and/or include a machine learning engine 112*e* and machine learning datasets 112*f*. Machine learning engine 112*e* and machine learning datasets 112*f* may store instructions and/or data that may cause or enable access evaluation and control computing platform 110 to analyze data to identify patterns or sequences within received data to identify potential vulnerabilities, users having privileged access, authentication modifications, and the like. The machine learning datasets 112*f* may be generated based on analyzed data (e.g., data from previously received data, and the like), raw data, and/or received from one or more outside sources.

The machine learning engine 112*e* may receive data and, using one or more machine learning algorithms, may generate one or more machine learning datasets 112*f*. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

Access evaluation and control computing platform may further have, store and/or include notification module 112*g*. Notification module 112*g* may store instructions and/or data that may cause or enable the access evaluation and control computing platform 110 to receive outputs (e.g., based on machine learning) such as application vulnerabilities, users having privileged entitlements, authentication modifications, and the like, and may generate one or more users interfaces. The user interfaces may be interactive and may be transmitted to one or more devices, such as internal computing system 1 120, internal computing system 2 125, remote user computing device 170, remote user computing device 175, local user computing device 150, local user computing device 155, or the like. The notifications may then be displayed on a display of the device.

FIGS. 2A-2F depict one example illustrative event sequence for implementing dynamic access evaluation and control functions in accordance with one or more aspects described herein. The events shown in the illustrative event sequence are merely one example sequence and additional events may be added, or events may be omitted, without departing from the invention.

With reference to FIG. 2A, at step 201, unauthorized activity data may be generated. For instance, as unauthorized activity, or potential unauthorized activity is detected, unauthorized activity data may be generated by, for instance, internal computing system 1 120. In some examples, the unauthorized activity data may include account takeover attempts and/or other data related to potential unauthorized activity.

As discussed herein, the account takeover or other data may be processed by, for instance, internal computing system 1 120, to generate the unauthorized activity data that may be further processed by access evaluation and control computing platform 110. Additionally or alternatively, the raw data may be transmitted from the internal computing system 1 120 to the access evaluation and control computing platform 110 for processing.

At step 202, a connection may be established between internal computing system 1 120 and access evaluation and control computing platform 110. For instance, a first wireless connection may be established between the access evaluation and control computing platform 110 and internal computing system 1 120. Upon establishing the first wireless connection, a communication session may be initiated between access evaluation and control computing platform 110 and internal computing system 1 120.

At step 203, the unauthorized activity data generated by internal computing system 1 120 may be transmitted from internal computing system 1 120 to access evaluation and control computing platform 110. For instance, the unauthorized activity data may be transmitted during the communication session initiated upon establishing the first wireless connection.

At step 204, the unauthorized activity data may be received by access evaluation and control computing platform 110 and, at step 205, the unauthorized activity data may be processed. For instance, the received unauthorized activity data may be processed to identify one or more applications having a vulnerability or potential vulnerability (e.g., frequent account takeover attempts, successful account takeover attempts, or the like). In some examples, machine learning may be used to identify applications having a vulnerability or potential vulnerability.

With reference to FIG. 2B, at step 206, one or more users associated with applications having a vulnerability of potential vulnerability may be identified. For instance, users associated with each application identified as vulnerable or potentially vulnerable may be identified. In some examples, the users may be employees of the entity or enterprise implementing the access evaluation and control computing platform 110. For instance, internal computing system 1 120 may host or execute an online banking application. The online banking application may have been identified as a vulnerable or potentially vulnerable application. Accordingly, all users (e.g., who are employees of the entity) of the online banking application may be identified.

At step 207, entitlements associated with vulnerable or potentially vulnerable applications may be identified and evaluated. For instance, metadata from one or more sources may be analyzed to identify entitlements for an application, entitlements having privileged access, or the like. In some examples, entitlements associated with each application identified as vulnerable or potentially vulnerable may be identified. In continuing the example above, entitlements associated with the online banking application may be identified. The identified entitlements may be further evaluated to determine entitlements that provide privileged access (e.g., administrative privileges, read/write access, or the like).

At step 208, the identified users may be compared to the identified entitlements having privileged access to identify users having privileged access entitlements. For instance, the identified users having access to the vulnerable or potentially vulnerable application may be compared to entitlements having privileged access to identify users who have access and privileged entitlements. This group of users may be a subset (e.g., fewer than all) of the identified users having access to the application.

At step 209, one or more authentication modifications may be identified. For instance, based on the users having privileged entitlements, one or more modifications may be made to authentication requirements associated with those users. In some arrangements, the user may be forced to use a secondary identifier to access a system, application or account. Additionally or alternatively, multi-factor authentication may be required. In continuing the example above, if an employee of the entity has an account with privileged access entitlements, and is also a customer of the entity so has an online banking account via the application, one or more authentication modifications may be identified to control access to the application for that user. For instance, the user may be required to use a secondary identifier that has limited access to, for instance, the Internet. Additionally or alternatively, multifactor authentication may be required. In some examples, the multi-factor authentication may include a one-time or single-use passcode that may provide access for a predetermined time period and, at expiration of the time period, may lock the user out of the account, system or application and may require the user to re-authenticate in order to gain access.

At step 210, an instruction modifying one or more authentication requirements may be generated. For instance, an instruction, command, or the like, to implement the one or more identified authentication requirements may be generated.

At step 211, the generated instruction may be transmitted from the access evaluation and control computing platform 110 to internal computing system 1 120. In some examples, the instruction may be transmitted during the communication session initiated upon establishing the first wireless connection. In some examples, if a wireless connection is not established, a new wireless connection may be establishing and communication session initiated.

With reference to FIG. 2C, at step 212, the transmitted instruction may be received by internal computing system 1 120 and executed by internal computing system 1 120.

At step 213, a notification may be generated by access evaluation and control computing platform 110. For instance, a notification indicating that modified authentication requirements have been implemented or executed, as well as information related to the modified authentication requirements may be generated.

At step 214, a connection may be established between local user computing device 150 and access evaluation and control computing platform 110. For instance, a second wireless connection may be established between the access evaluation and control computing platform 110 and local user computing device 150. Upon establishing the second wireless connection, a communication session may be initiated between access evaluation and control computing platform 110 and local user computing device 150.

At step 215, the generated notification may be transmitted from access evaluation and control computing platform 110 to local user computing device 150. For instance, the generated notification may be transmitted during the communication session initiated upon establishing the second wireless connection.

At step 216, the generated notification may be received by local user computing device 150 and displayed by a display of the device. This may alert the user to a potential issue and indicate that authentication requirements have been modified.

Figure 2D:
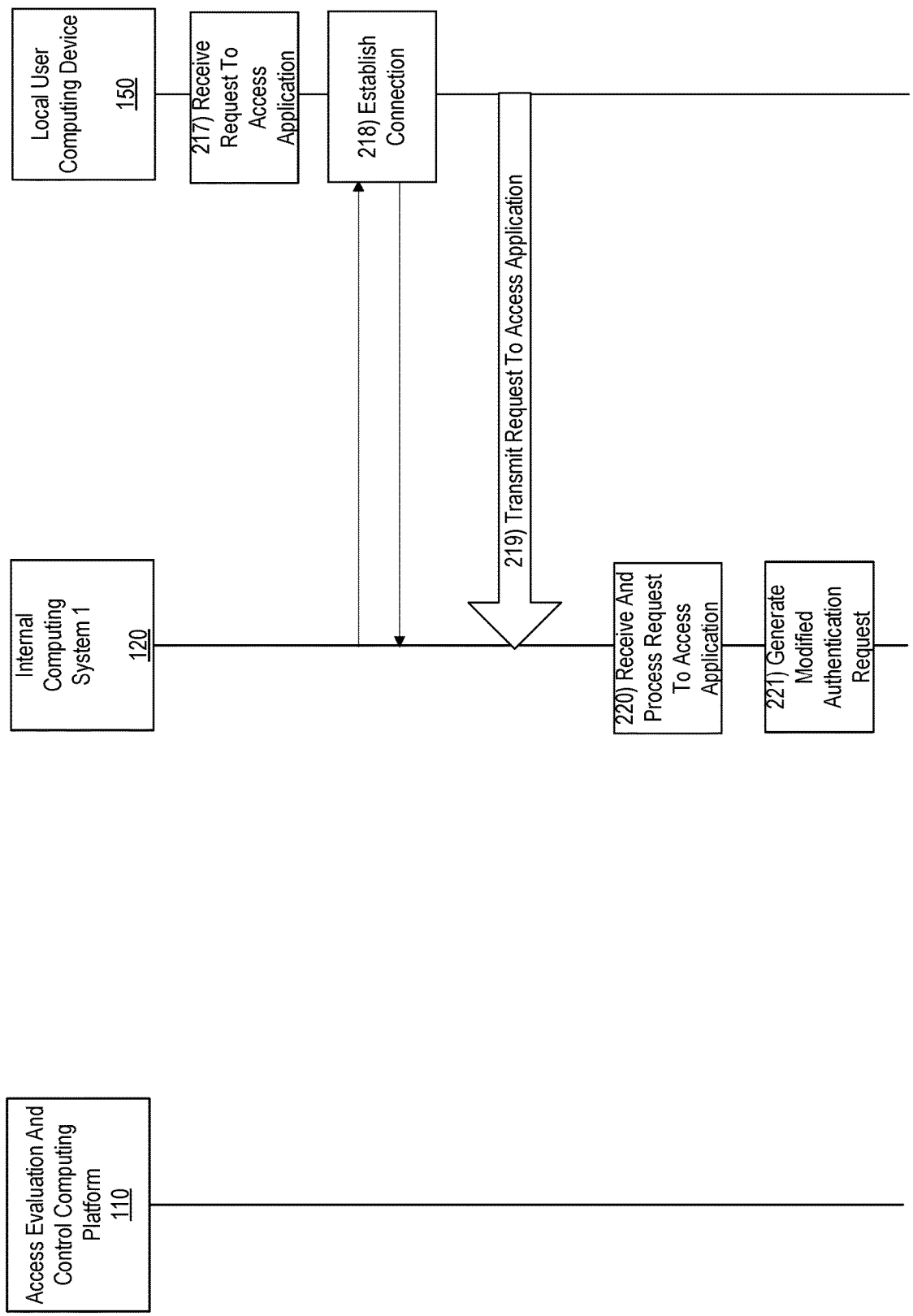

With reference to FIG. 2D, at step 217, a request to access an application may be received. For instance, a user may provide input to, for instance, local user computing device 150, requesting access to an application. In some examples, the request for access may be received by remote user computing device 170.

At step 218, a connection may be established between local user computing device 150 and internal computing system 1 120 (e.g., a system or device hosting or executing the application to which access is requested, controlling access to the application for which access is requested, or the like). For instance, a third wireless connection may be established between the internal computing system 1 120 and local user computing device 150. Upon establishing the third wireless connection, a communication session may be initiated between internal computing system 1 120 and local user computing device 150.

At step 219, the request to access the application may be transmitted from local user computing device 150 to internal computing system 1 120. For instance, the request to access the application may be transmitted during the communication session initiated upon establishing the third wireless connection.

At step 220, the request to access the application may be received and processed by internal computing system 1 120. For instance, the user requesting access or user identifier including in the request may be evaluated to identify one or more authentication requirements (e.g., modified authentication requirements) associated with the user.

At step 221, a modified authentication request may be generated. For instance, an authentication request including any identified authentication modifications may be generated by internal computing system 1 120.

Figure 2E:
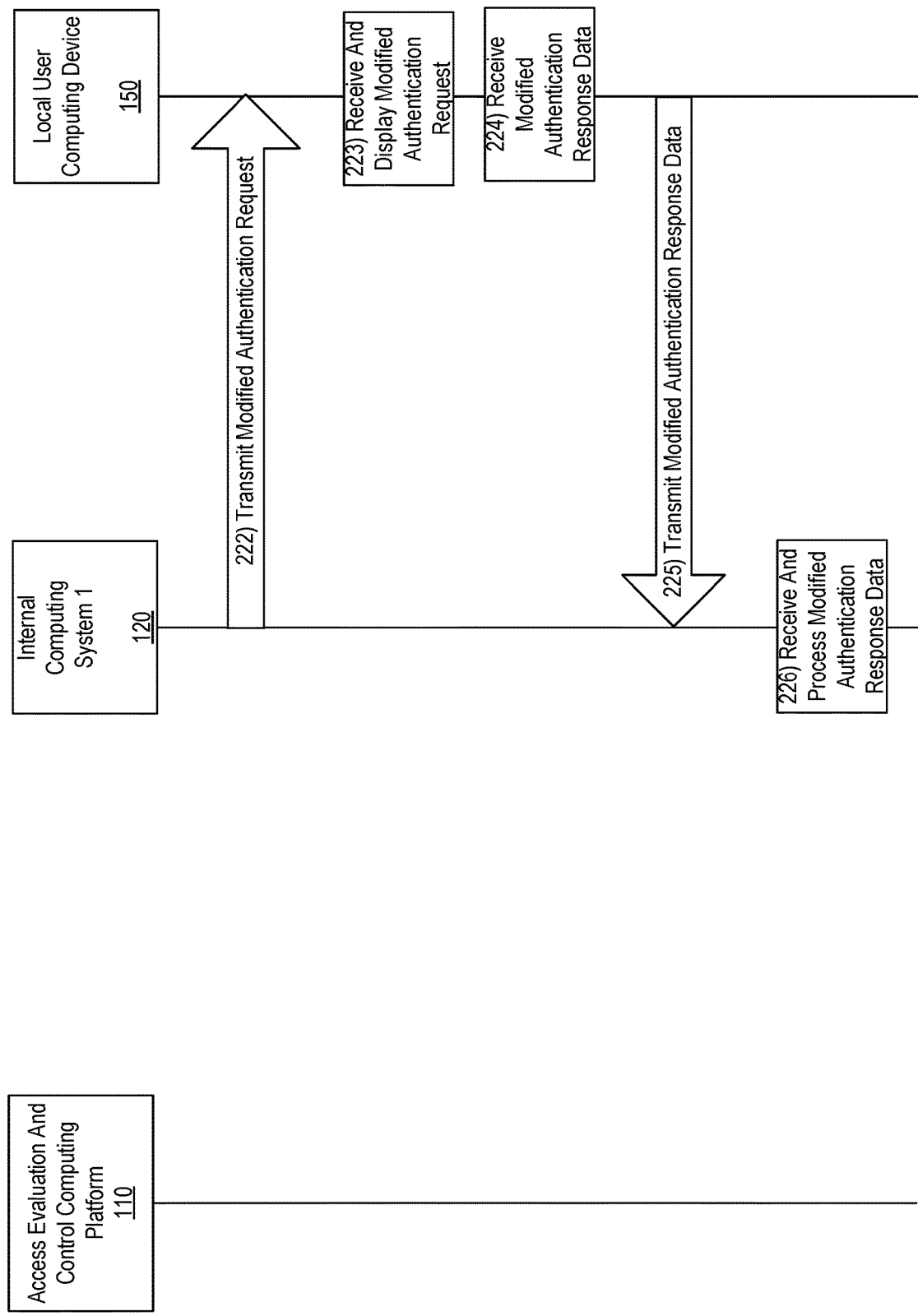

With reference to FIG. 2E, at step 222, the modified authentication request may be transmitted from internal computing system 1 120 to local user computing device 150. For instance, the modified authentication request may be transmitted during the communication session initiated upon establishing the third wireless communication session. In some examples, if a wireless connection is not established, another wireless connection may be established and communication session initiated.

At step 223, the modified authentication request may be received by local user computing device 150 and displayed by a display of the device.

At step 224, modified authentication response data may be received. For instance, a user may include response data responsive to the displayed request for modified authentication data. The modified authentication response data may include a one-time passcode, may include a user inputting an alternate user identifier, or the like.

At step 225, the modified authentication response data may be transmitted from the local user computing device 150 to internal computing system 1 120. In some examples, the modified authentication response data may be transmitted during the communication session initiated upon establishing the third wireless connection. In some examples, another wireless connection may be established and communication session initiated.

At step 226, the modified authentication response data may be received by internal computing system 1 120 and processed. For instance, the modified authentication response data may be evaluated to determine whether it is the type of data requested (e.g., based on the modified authentication requested), as well as whether it matches pre-stored modified authentication data (e.g., the generated one-time passcode, or the like).

Figure 2F:
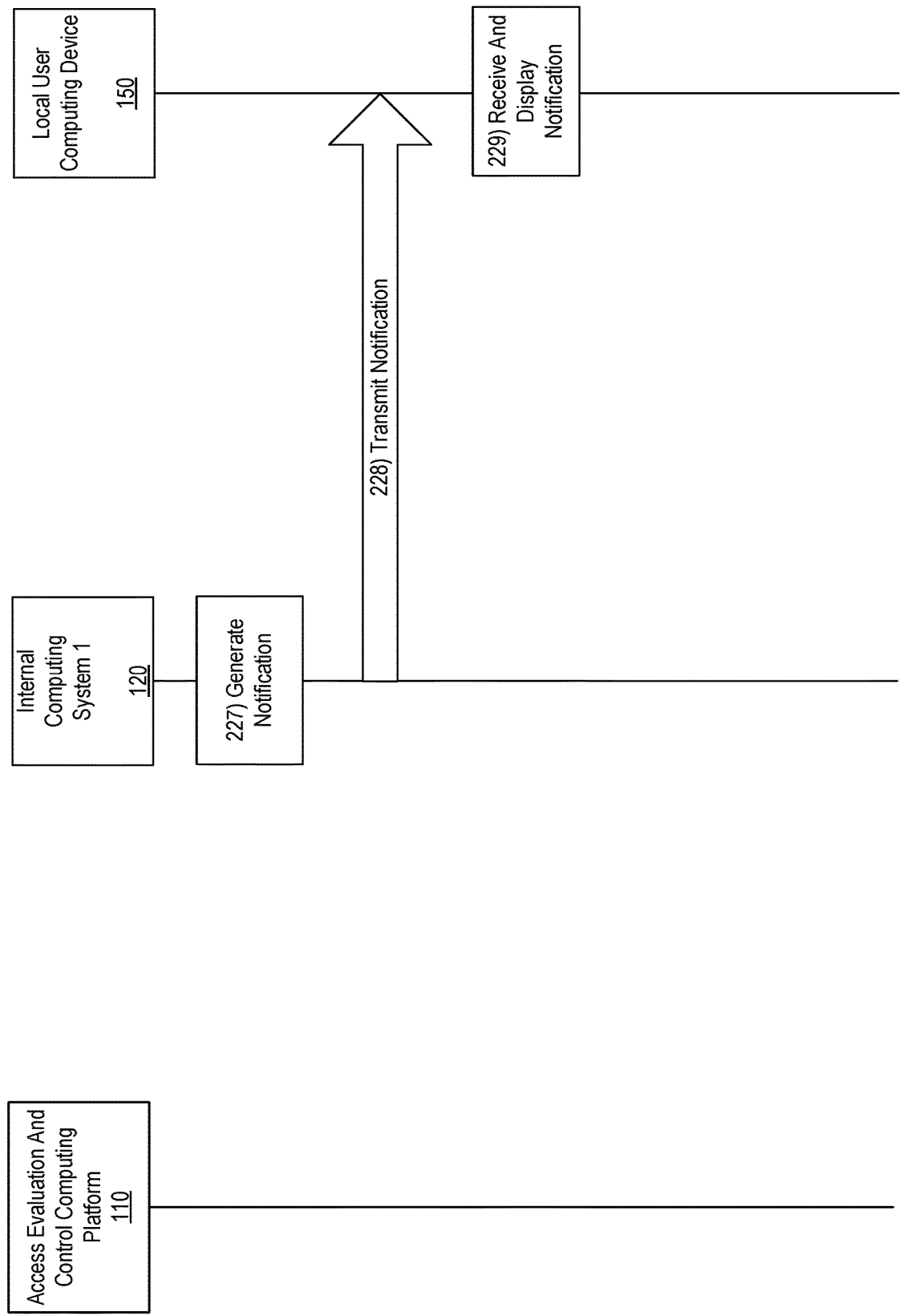

With reference to FIG. 2F, in response to processing the modified authentication response data, a notification may be generated at step 227. For instance, a notification indicating whether the user was authenticated, whether the request was denied, whether additional authenticating information is requested, may be generated.

At step 228, the generated notification may be transmitted to local user computing device 150. At step 229, the notification may be received by local user computing device 150 and displayed by a display of local user computing device 150.

Figure 3:
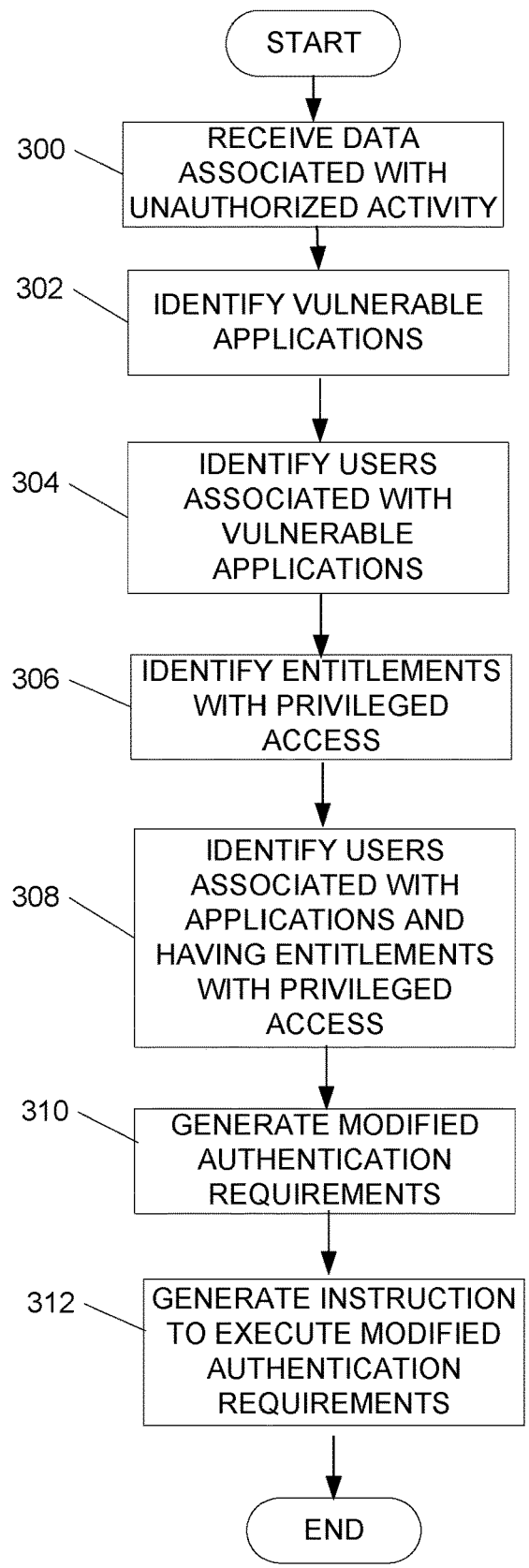
FIG. 3 depicts an illustrative method for implementing and using dynamic access evaluation and control functions according to one or more aspects described herein.

FIG. 3 is a flow chart illustrating one example method of implementing dynamic access evaluation and control functions, according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 300, data associated with unauthorized activity may be received. For instance, data such as account takeover attempt data may be received. In some examples, the data may be processed prior to being received.

At step 302, the unauthorized activity data may be analyzed to identify one or more vulnerable or potentially vulnerable applications. For instance, based on the unauthorized activity data, one or more vulnerable or potentially vulnerable applications may be identified.

At step 304, one or more users associated with the identified vulnerable or potentially vulnerable applications may be identified. For instance, a first plurality of users having access to one or more of the vulnerable or potentially vulnerable applications may be identified. In some examples, users having access to each identified vulnerable or potentially vulnerable application may be identified.

At step 306, entitlements for the one or more vulnerable or potentially vulnerable applications may be identified. For instance, entitlements having privileged access may be identified. In some examples, entitlements having privileged access for each application of the one or more identified vulnerable or potentially vulnerable applications may be identified.

At step 308, the entitlements and identified users may be further analyzed to identify users having or associated with the entitlements having privileged access. For instance, a second plurality of users may be identified and may include users who have access to vulnerable or potentially vulnerable applications and have privileged entitlements to vulnerable or potentially vulnerable applications. In some examples, the second plurality of users may include fewer users (e.g., a subset) than the first plurality of users.

At step 310, one or more modified authentication requirements for the second plurality of users may be identified. For instance, users in the second plurality of users may be required to use an alternate login or user identifier to access an application. Additionally or alternatively, multi-factor authentication may be required for access to an application. Various other authentication modifications may be used without departing from the invention.

At step 312, an instruction or command to execute the identified modified authentication requirement may be generated and transmitted to one or more computing devices. The instruction or command may execute upon being received by the one or more computing devices.

Figure 4:
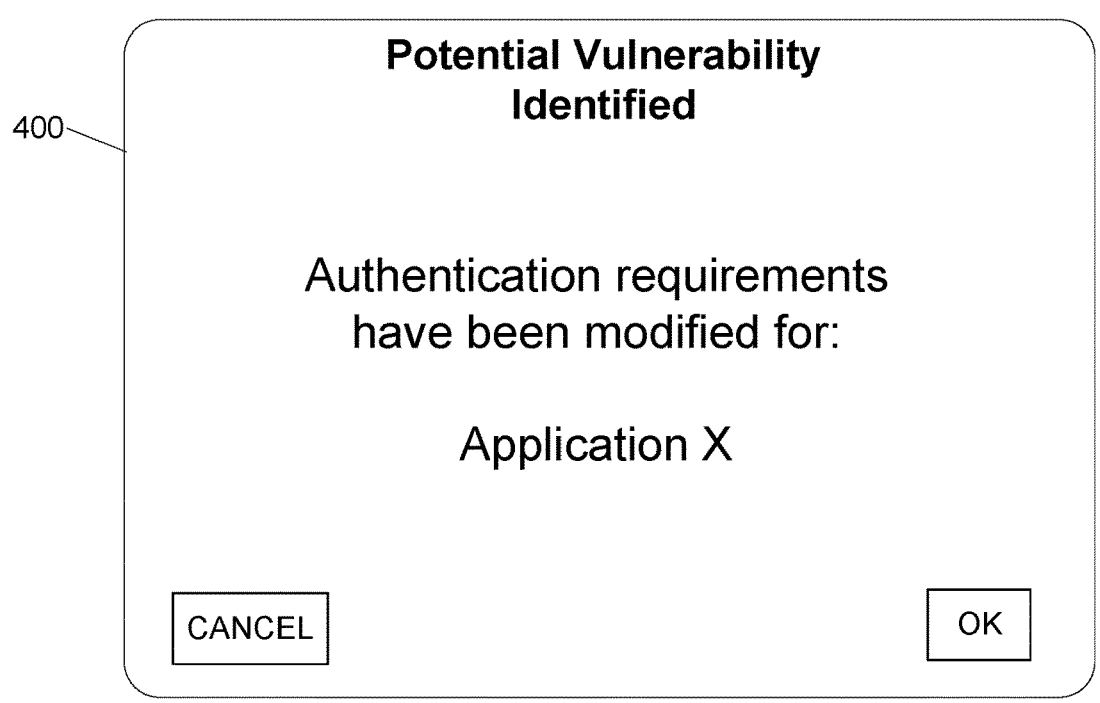
FIG. 4 illustrates one example user interface that may be generated according to one or more aspects described herein.

FIG. 4 illustrates one example user interface that may be generated in accordance with one or more aspects described herein. The user interface 400 may include a notification that modified authentication requirements have been implemented and/or executed for one or more applications. In some examples, user interface 400 may be transmitted to a device, such as local user computing device 150, local user computing device 155, or the like, and may be displayed by a display of the computing device.

Figure 5:
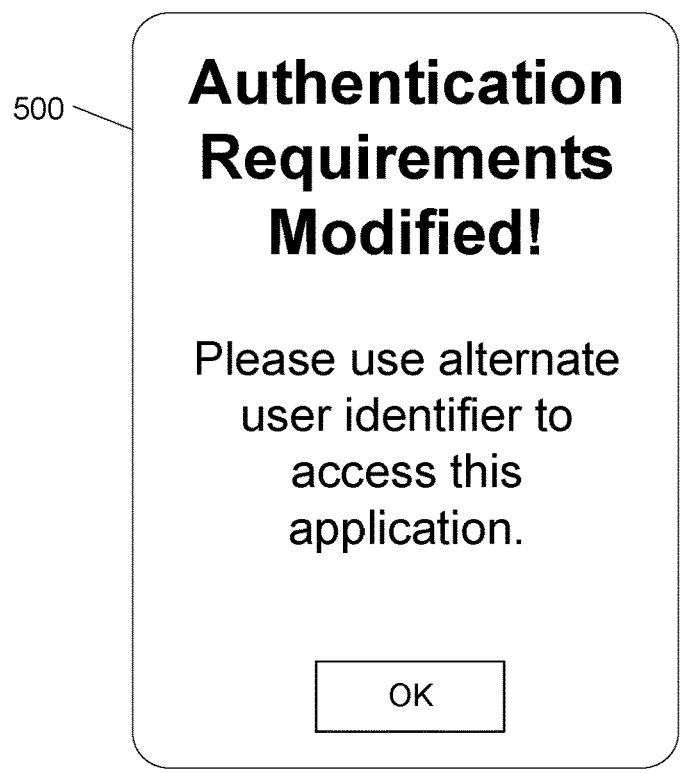
FIG. 5 illustrates one example user interface that may be generated according to one or more aspects described herein.

FIG. 5 illustrates another example user interface that may be generated in accordance with one or more aspects described herein. The interface 500 may include a notification that modified authentication requirements have been executed and may indicate one or more modified authentication requirements that are not required to access an application. In some examples, the user interface 500 may be transmitted to computing device, such as remote user computing device 150, remote user computing device 155, or the like.

Aspects discussed herein may be used to dynamically evaluate and control access to one or more applications or systems. For instance, unauthorized activity, such as account takeover attempts, may be captured and analyzed. Monitoring unauthorized activity, such as account takeover attempts, may aid in mitigating impact of the unauthorized activity. For instance, should the unauthorized actor be successful in taking over an account, he or she may bypass controls, halt logging, or any of various other types of collusive activity that may have a serious impact on an entity and/or a user. Accordingly, early detection and control of any potential account takeover attempts may significantly reduce impact of the unauthorized activity.

Aspects described herein may apply to a variety of users accounts. For instance, while login credentials for external-facing applications may be vulnerable or more likely to experience attempted unauthorized activity, login credentials for internal accounts may also be at risk for account takeover attempts. Accordingly, employee login credentials or user identifiers (e.g., to login to internal enterprise systems), user or customer login credentials or user identifiers (e.g., to login to external-facing systems or applications), or both may be at risk from authorized activity. Accordingly, the arrangements described herein may evaluate potential unauthorized activity, such as takeover attempts, for both external-facing applications and systems and internal-facing applications or systems (e.g., internal to the enterprise).

As discussed above, employee user accounts, login credentials, and the like, may pose an increased risk because unauthorized activity might not impact only the user as a customer but also the entity or enterprise of which he is an employee. By identifying applications that may be vulnerable, and by identifying users having privileged access to those applications, preventative measures, such as modified authentication requirements, may be implemented or executed to mitigate impact of any unauthorized activity.

Aspects described herein leverage several different metadata repositories that may be specific to the entity or enterprise. Metadata may be updated and entitlements may be modified (e.g., new entitlements may be added, entitlements not previously identified as privileged access may now have privileged access, and the like). Accordingly, as the metadata being analyzed changes and is modified, the system may update users impacted, accounts impacted, and the like, without requiring substantial modifications of the systems performing the analysis.

In some examples, metadata may be received from various sources. In some examples, tens of millions of pieces of data (e.g., entitlements) may be processed including 11 pieces of metadata for each entitlement. As the sources change, additional or alternative metadata may be captured. Further, sources of data may be modified without requiring changes to the analysis of the data. Further, the criteria for what constitutes privileged access may evolve while still being captured.

As discussed above, the identification of an entitlement having privileged access may be a pivot point for whether to heighten authentication requirements. Use of heightened authentication requirements at an entitlement level enables specific control of user access, authentication requirements, and the like. In some examples, the use of entitlement level controls may be more granular than, for instance, controlling access based on user roles, or the like.

In examples in which a user is a customer and an employee, should the user leave the employment, his or her employee account may be deactivated and the user's status may change to ensure continued access to the applications, systems, or the like, as a customer while preventing access as an employee.

In some examples, aspects described herein may apply to wire-transfer capabilities and/or other transfer functions. In some arrangements, bundles of access may be evaluated and authentication requirements modified for the bundle of access.

In some arrangements, identifying applications may include prioritizing applications and/or entitlements for analysis and/or next steps. Accordingly, aspects described herein may aid in allocating resources to mitigate impact of potential unauthorized activity, heighten security, or the like.

Aspects herein may also be directed to auditing aspects of the arrangements described to understand accuracy, efficiency, and the like. One or more reports may be generated to display this information.

Figure 6:
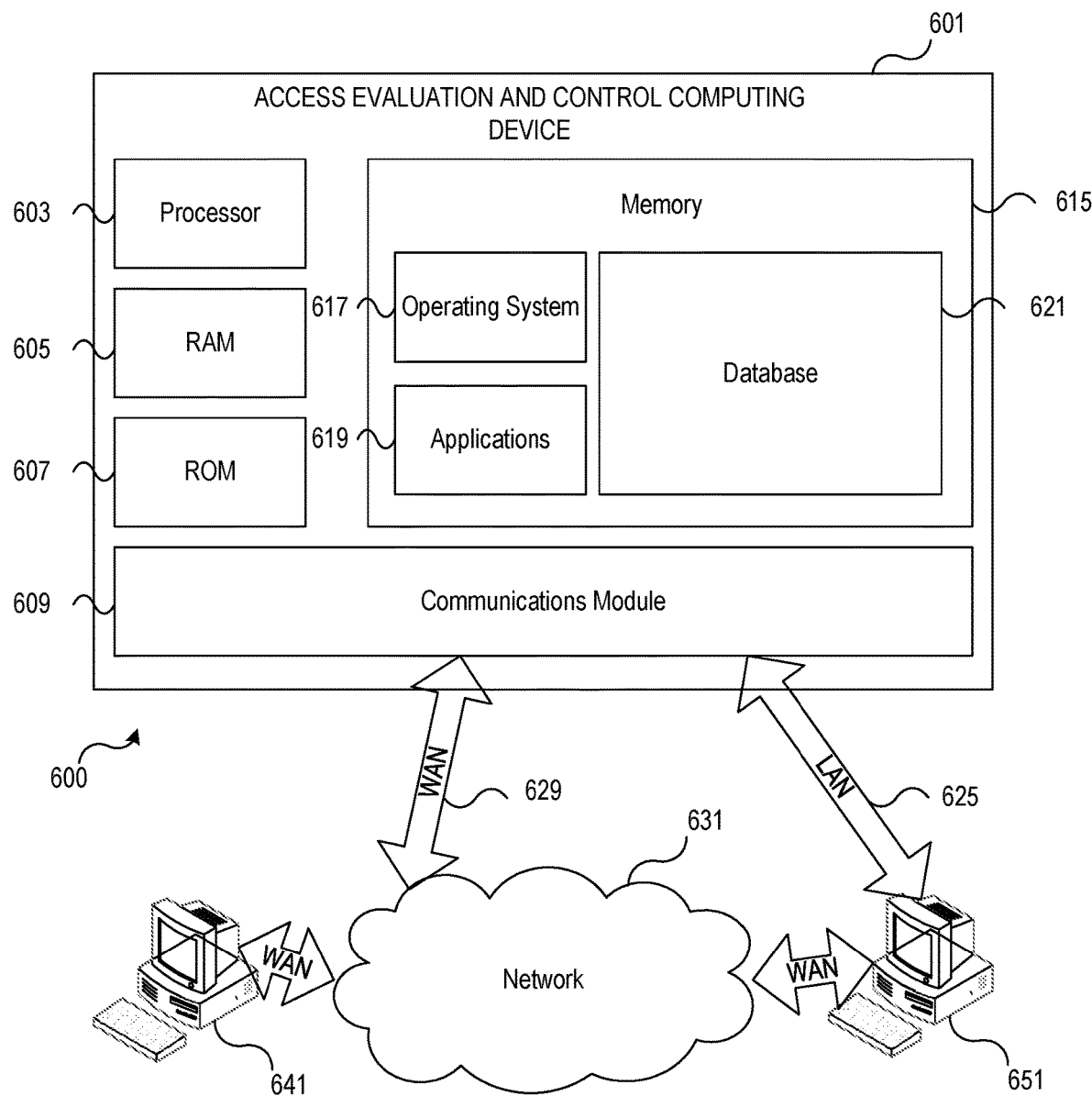
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include access evaluation and control computing device 601 having processor 603 for controlling overall operation of access evaluation and control computing device 601 and its associated components, including Random Access Memory (RAM) 605, Read-Only Memory (ROM) 607, communications module 609, and memory 615. Access evaluation and control computing device 601 may include a variety of computer readable media. Computer readable media may be any available media that may be accessed by access evaluation and control computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by access evaluation and control computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on access evaluation and control computing device 601. Such a processor may execute computer-executable instructions stored on a computer-readable medium.

Software may be stored within memory 615 and/or storage to provide instructions to processor 603 for enabling access evaluation and control computing device 601 to perform various functions as discussed herein. For example, memory 615 may store software used by access evaluation and control computing device 601, such as operating system 617, application programs 619, and associated database 621. Also, some or all of the computer executable instructions for access evaluation and control computing device 601 may be embodied in hardware or firmware. Although not shown, RAM 605 may include one or more applications representing the application data stored in RAM 605 while access evaluation and control computing device 601 is on and corresponding software applications (e.g., software tasks) are running on access evaluation and control computing device 601.

Communications module 609 may include a microphone, keypad, touch screen, and/or stylus through which a user of access evaluation and control computing device 601 may provide input, and may also include one or more of a speaker for providing audio output and a video display device for providing textual, audiovisual and/or graphical output. Computing system environment 600 may also include optical scanners (not shown).

Access evaluation and control computing device 601 may operate in a networked environment supporting connections to one or more remote computing devices, such as computing devices 641 and 651. Computing devices 641 and 651 may be personal computing devices or servers that include any or all of the elements described above relative to access evaluation and control computing device 601.

The network connections depicted in FIG. 6 may include Local Area Network (LAN) 625 and Wide Area Network (WAN) 629, as well as other networks. When used in a LAN networking environment, access evaluation and control computing device 601 may be connected to LAN 625 through a network interface or adapter in communications module 609. When used in a WAN networking environment, access evaluation and control computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

Figure 7:
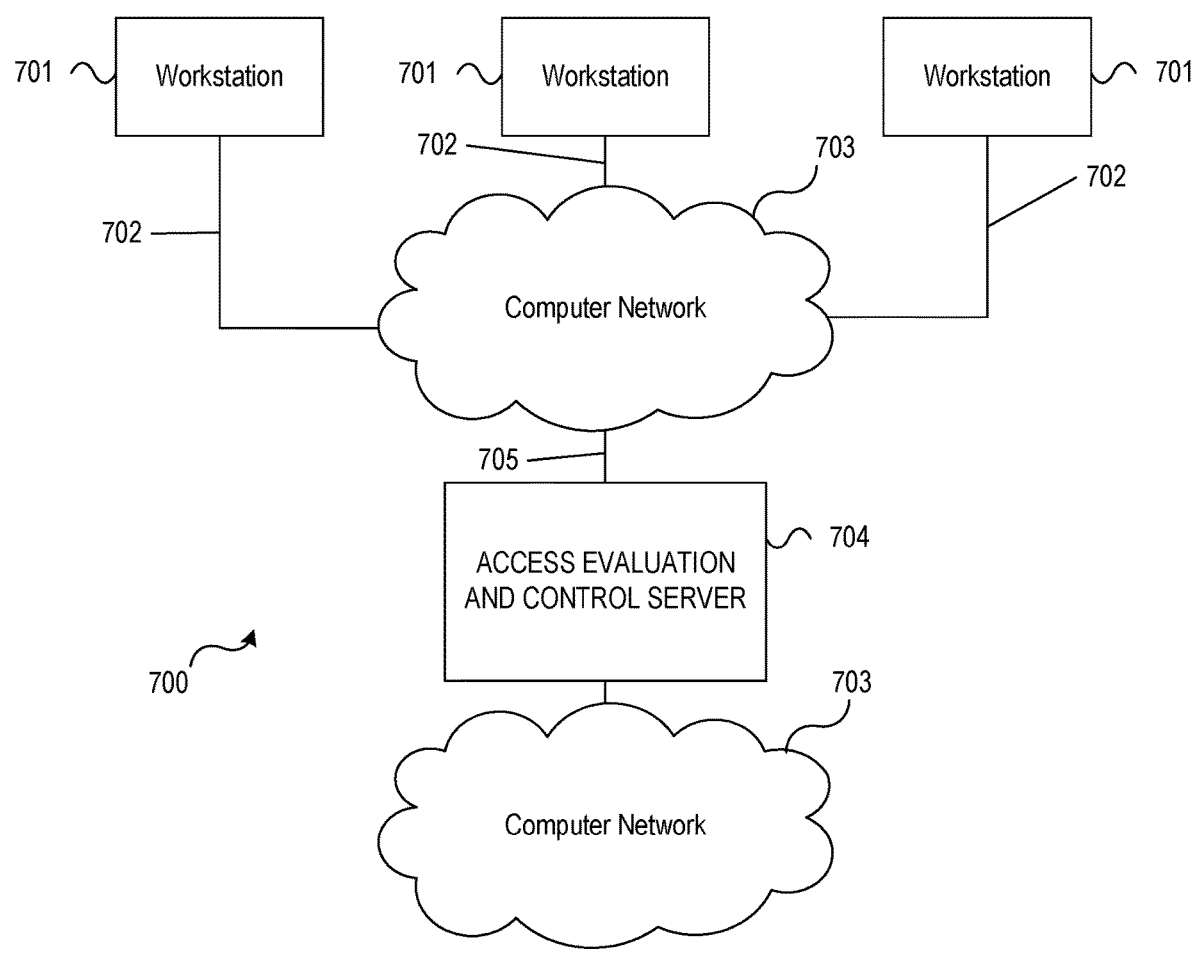
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to access evaluation and control server 704. In system 700, access evaluation and control server 704 may be a server, processor, computer, or data processing device, or combination of the same, configured to perform the functions and/or processes described herein. Server 704 may be used to receive and/or process unauthorized activity data, identify vulnerable or potentially vulnerable applications, identify users associated with those applications, identify application entitlements having privileged access, identify users having privileged access entitlements, identify one or more modified authentication requirements, execute one or more modified authentication requirements, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and access evaluation and control server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      receive unauthorized activity data;
      identify, based on the unauthorized activity data, one or more applications having an identified vulnerability;
      identify a first plurality of users having access to each application of the one or more applications having the identified vulnerability;
      identify, for each application of the one or more applications having the identified vulnerability, entitlements of each application providing privileged access;
      identify a second plurality of users who are holders of the entitlements of each application providing privileged access;
      identify one or more modified authentication requirements for the second plurality of users; and
      execute the one or more modified authentication requirements for the second plurality of users.

2. The computing platform of claim 1, wherein executing the modified authentication requirements for the second plurality of users includes causing a computing device to modify authentication data requested to access a respective application.

3. The computing platform of claim 1, wherein modifying access requirements for each user of the second plurality of users includes identifying a secondary identifier, different from a primary identifier of a respective user, associated with each user to be used to access a respective application.

4. The computing platform of claim 1, wherein modifying access requirements for each user of the second plurality of users includes requiring multi-factor authentication of a respective user.

5. The computing platform of claim 4, wherein the multi-factor authentication includes at least submission of a single use passcode.

6. The computing platform of claim 5, wherein the single use passcode enables access for a predetermined time period.

7. The computing platform of claim 1, wherein the second plurality of users is a subset of the first plurality of users.

8. A method, comprising:
   receiving, by a computing platform having a memory and at least one processor, unauthorized activity data;
   identifying, by the at least one processor and based on the unauthorized activity data, one or more applications having an identified vulnerability;
   identifying, by the at least one processor, a first plurality of users having access to each application of the one or more applications having the identified vulnerability;
   identifying, by the at least one processor and for each application of the one or more applications having the identified vulnerability, entitlements of each application providing privileged access;
   identifying, by the at least one processor, a second plurality of users who are holders of the entitlements of each application providing privileged access;
   identifying, by the at least one processor, one or more modified authentication requirements for the second plurality of users; and
   executing, by the at least one processor, the one or more modified authentication requirements for the second plurality of users.

9. The method of claim 8, wherein executing the modified authentication requirements for the second plurality of users includes generating an instruction causing a computing device to modify authentication data requested to access a respective application.

10. The method of claim 8, wherein modifying access requirements for each user of the second plurality of users includes identifying a secondary identifier, different from a primary identifier of a respective user, associated with each user to be used to access a respective application.

11. The method of claim 8, wherein modifying access requirements for each user of the second plurality of users includes requiring multi-factor authentication of a respective user.

12. The method of claim 11, wherein the multi-factor authentication includes at least submission of a single use passcode.

13. The method of claim 12, wherein the single use passcode enables access for a predetermined time period.

14. The method of claim 8, wherein the second plurality of users is a subset of the first plurality of users.

15. One or more non-transitory computer-readable media storing instructions that, when executed by a computing platform comprising at least one processor, memory, and a communication interface, cause the computing platform to:
   receive unauthorized activity data;
   identify, based on the unauthorized activity data, one or more applications having an identified vulnerability;
   identify a first plurality of users having access to each application of the one or more applications having the identified vulnerability;
   identify, for each application of the one or more applications having the identified vulnerability, entitlements of each application providing privileged access;
   identify a second plurality of users who are holders of the entitlements of each application providing privileged access;
   identify one or more modified authentication requirements for the second plurality of users; and
   execute the one or more modified authentication requirements for the second plurality of users.

16. The one or more non-transitory computer-readable media of claim 15, wherein executing the modified authentication requirements for the second plurality of users includes causing a computing device to modify authentication data requested to access a respective application.

17. The one or more non-transitory computer-readable media of claim 15, wherein modifying access requirements for each user of the second plurality of users includes identifying a secondary identifier, different from a primary identifier of a respective user, associated with each user to be used to access a respective application.

18. The one or more non-transitory computer-readable media of claim 15, wherein modifying access requirements for each user of the second plurality of users includes requiring multi-factor authentication of a respective user.

19. The one or more non-transitory computer-readable media of claim 18, wherein the multi-factor authentication includes at least submission of a single use passcode.

20. The one or more non-transitory computer-readable media of claim 19, wherein the single use passcode enables access for a predetermined time period.

21. The one or more non-transitory computer-readable media of claim 15, wherein the second plurality of users is a subset of the first plurality of users.

\* \* \* \* \*